United States Patent
Ohyama et al.

[15] 3,697,991
[45] Oct. 10, 1972

[54] SECONDARY RADAR RECEPTION SYSTEM

[72] Inventors: Takashi Ohyama, Tokyo; Akira Kawashige, Yokohama; Takeo Miyashita, Saitama, all of Japan

[73] Assignee: Kabushikikaisha Tokyo Seizosho (Tokyo Keiki Seizosho Co., Ltd.), Tokyo, Japan

[22] Filed: March 9, 1970

[21] Appl. No.: 17,739

[30] Foreign Application Priority Data

March 11, 1969 Japan..................44/18199
March 11, 1969 Japan..................44/29552

[52] U.S. Cl..................343/6.5 LC, 343/17.1 R
[51] Int. Cl..............................G01s 9/56
[58] Field of Search..........343/6.5 R, 6.5 LC, 17.1 R

[56] References Cited

UNITED STATES PATENTS 3,258,772  6/1966  Humpherys..........343/17.1 R
3,307,185  2/1967  Mefford..............343/17.1 R

*Primary Examiner*—T. H. Tubbesing
*Attorney*—Hill, Sherman, Meroni, Gross & Simpson

[57] ABSTRACT

A secondary radar reception system having a primary radar, a secondary radar receiver receiving a response wave transmitted from a secondary radar in response to a radar signal from the primary radar, and a synchronization control circuit interposed between the primary radar and the secondary radar receiver, the secondary radar receiver having an identification circuit which has a multiple delay circuit consisting of at least two separate multiple delay circuits with at least one multiplier circuit being interposed therebetween, a first input terminal of the multiplier circuit being supplied with the output of a first separate multiple delay circuit, a second input terminal being supplied with the response wave from the secondary radar and an output terminal being connected to the input side of a second separate multiple delay circuit.

6 Claims, 92 Drawing Figures

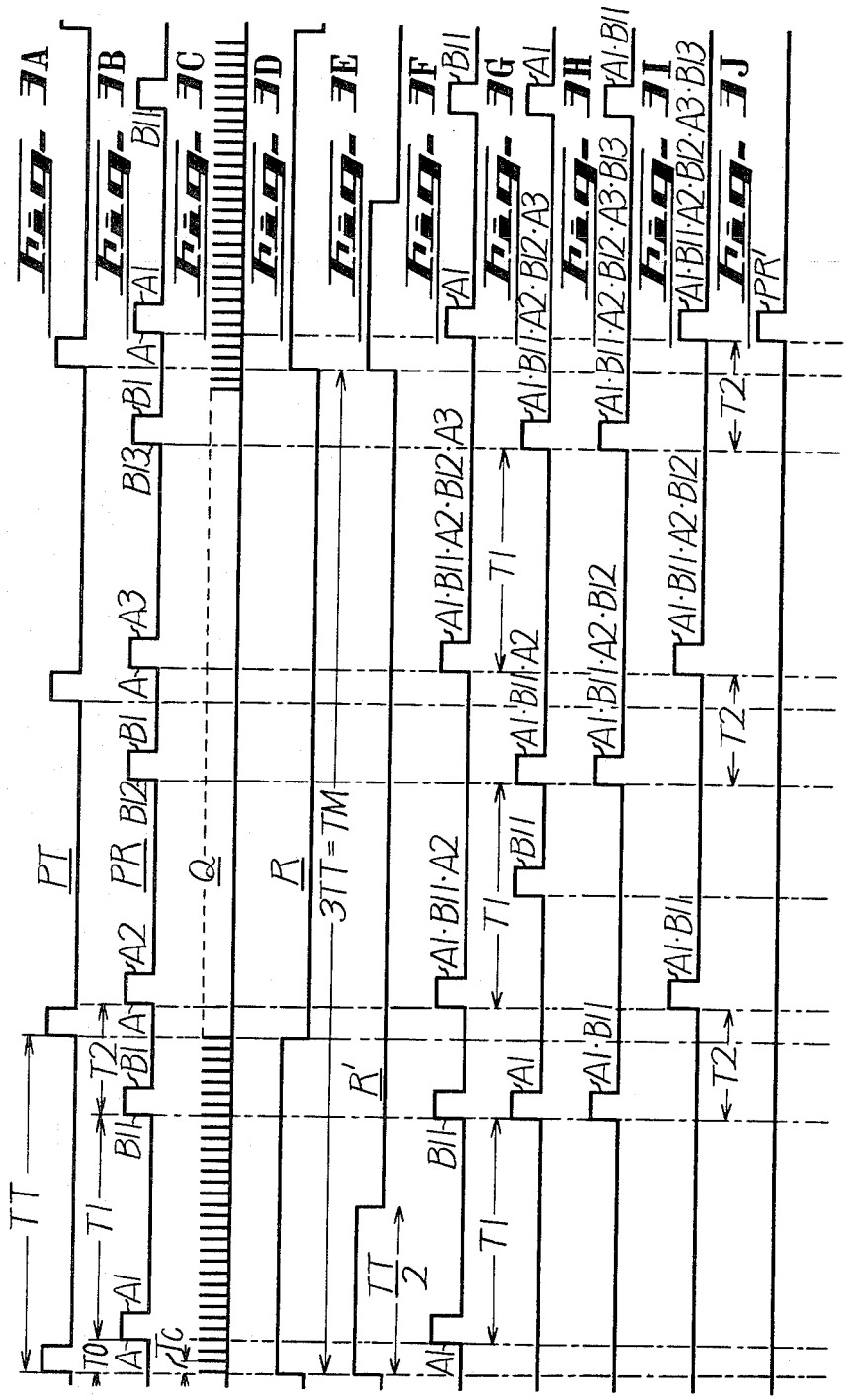

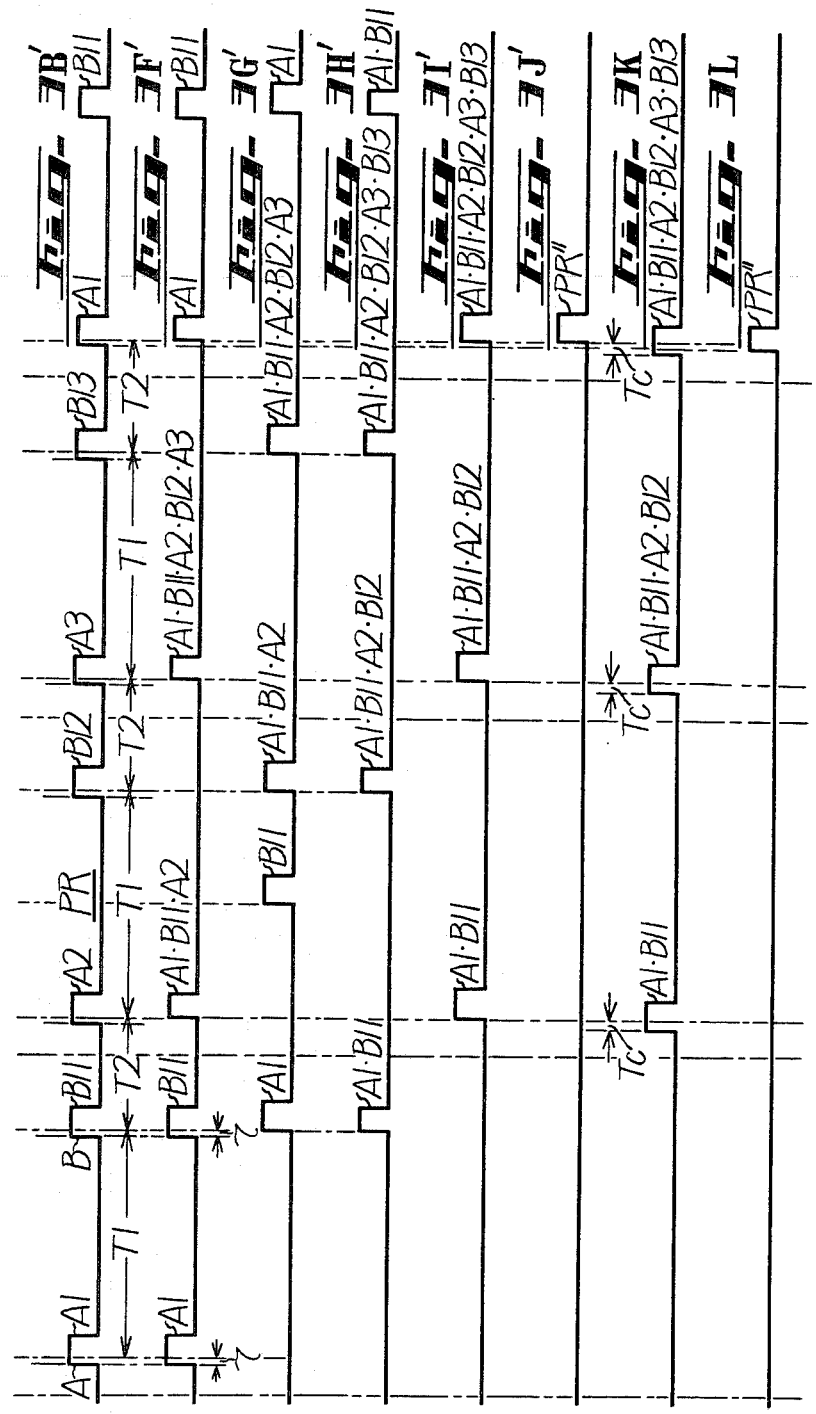

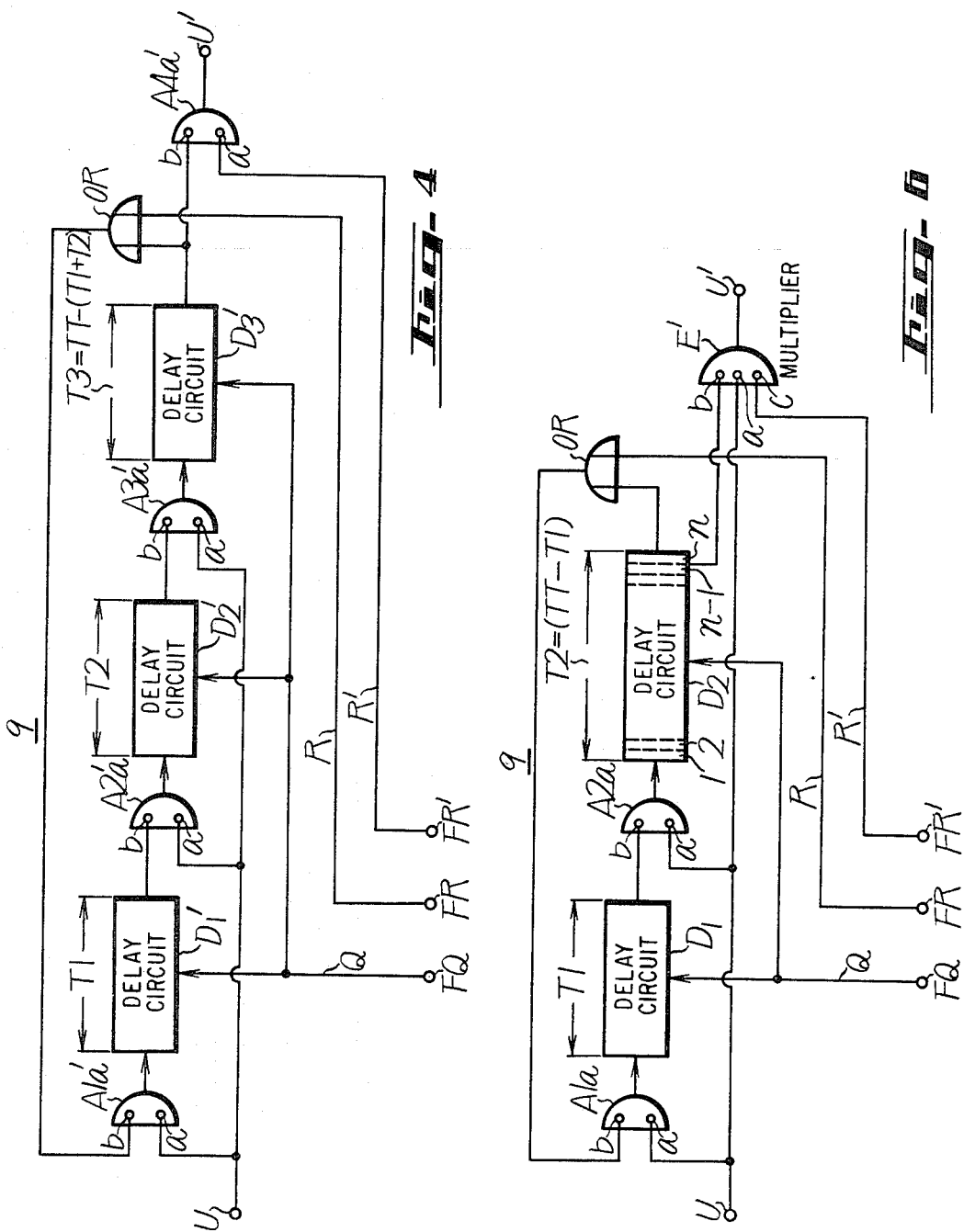

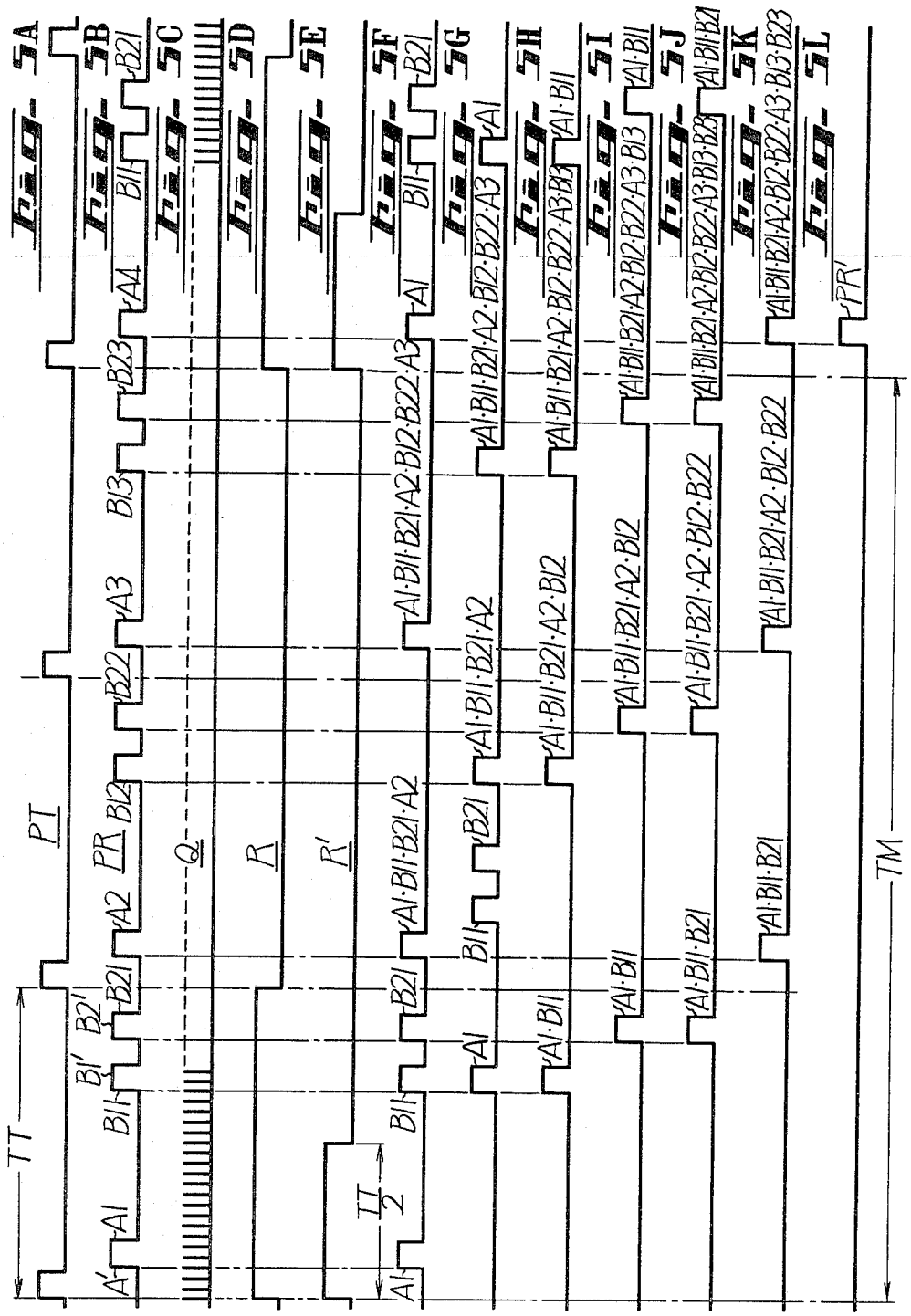

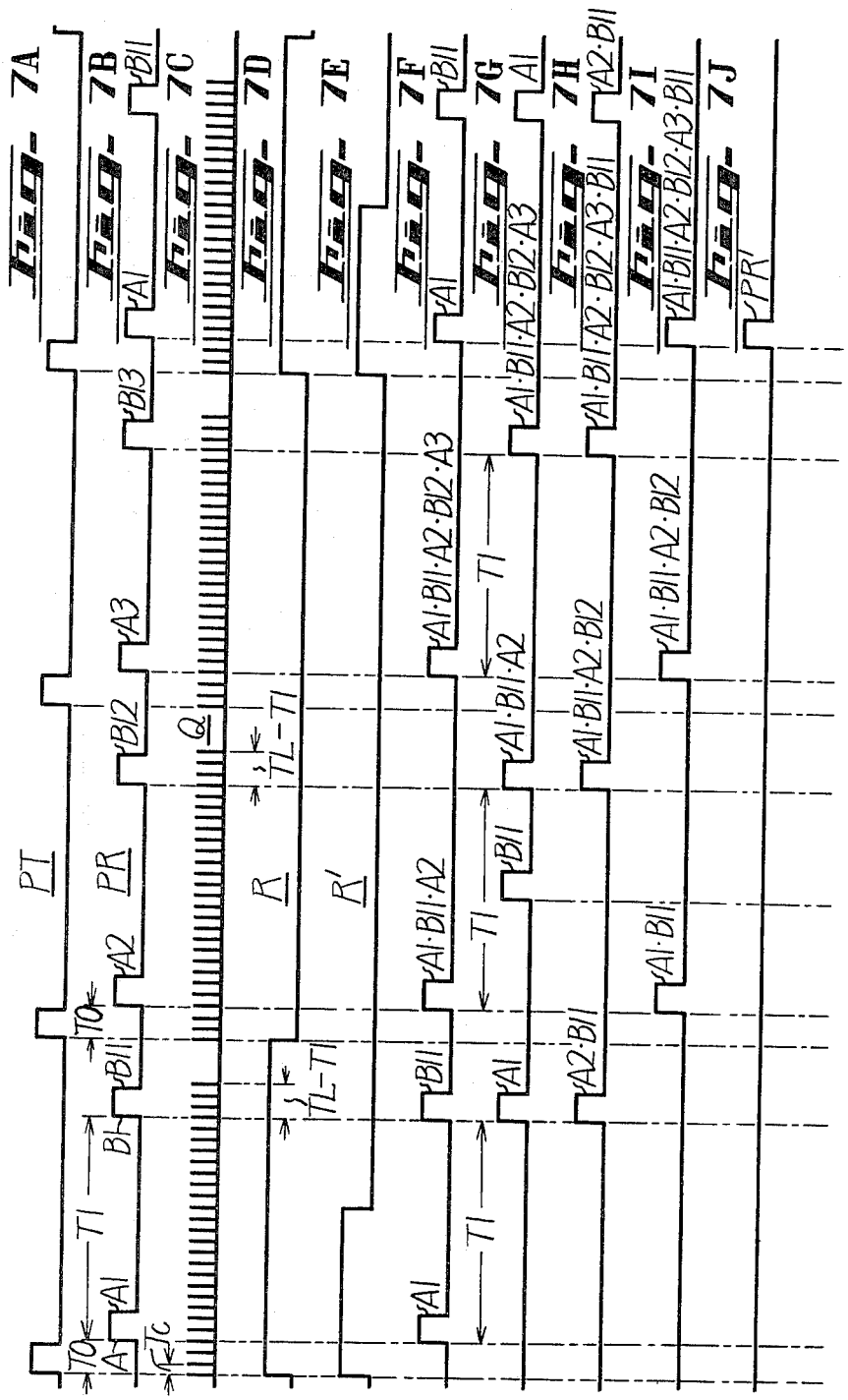

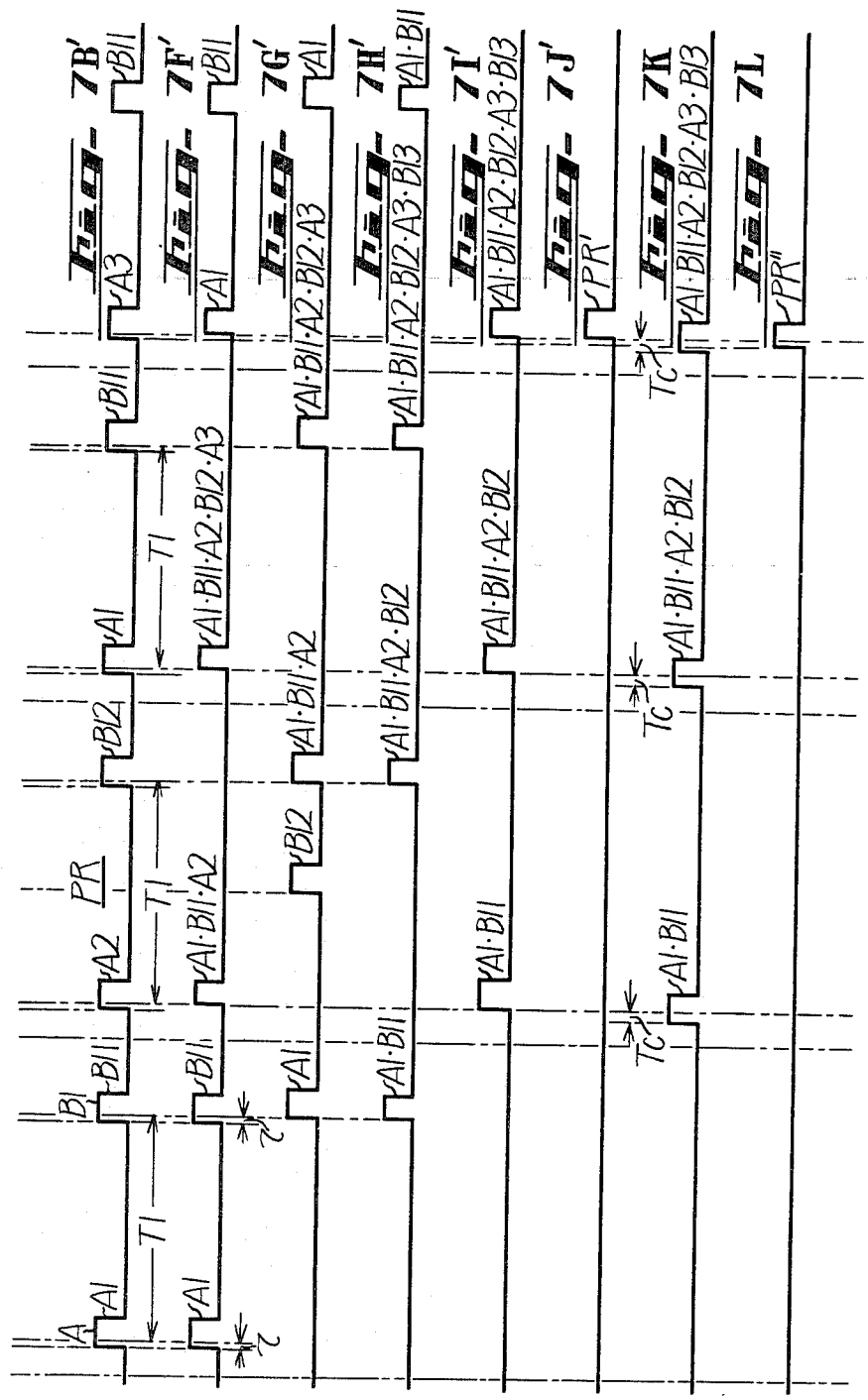

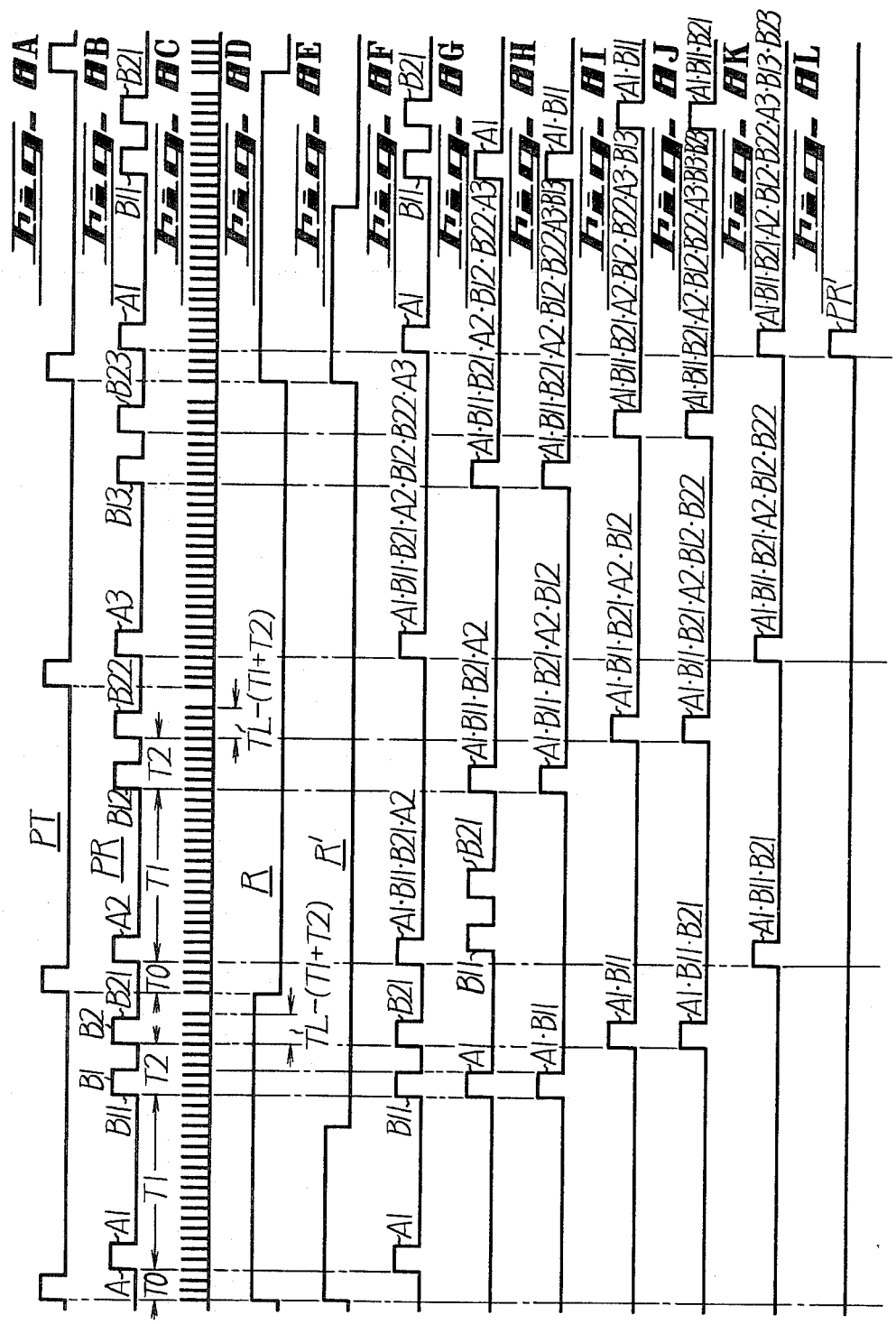

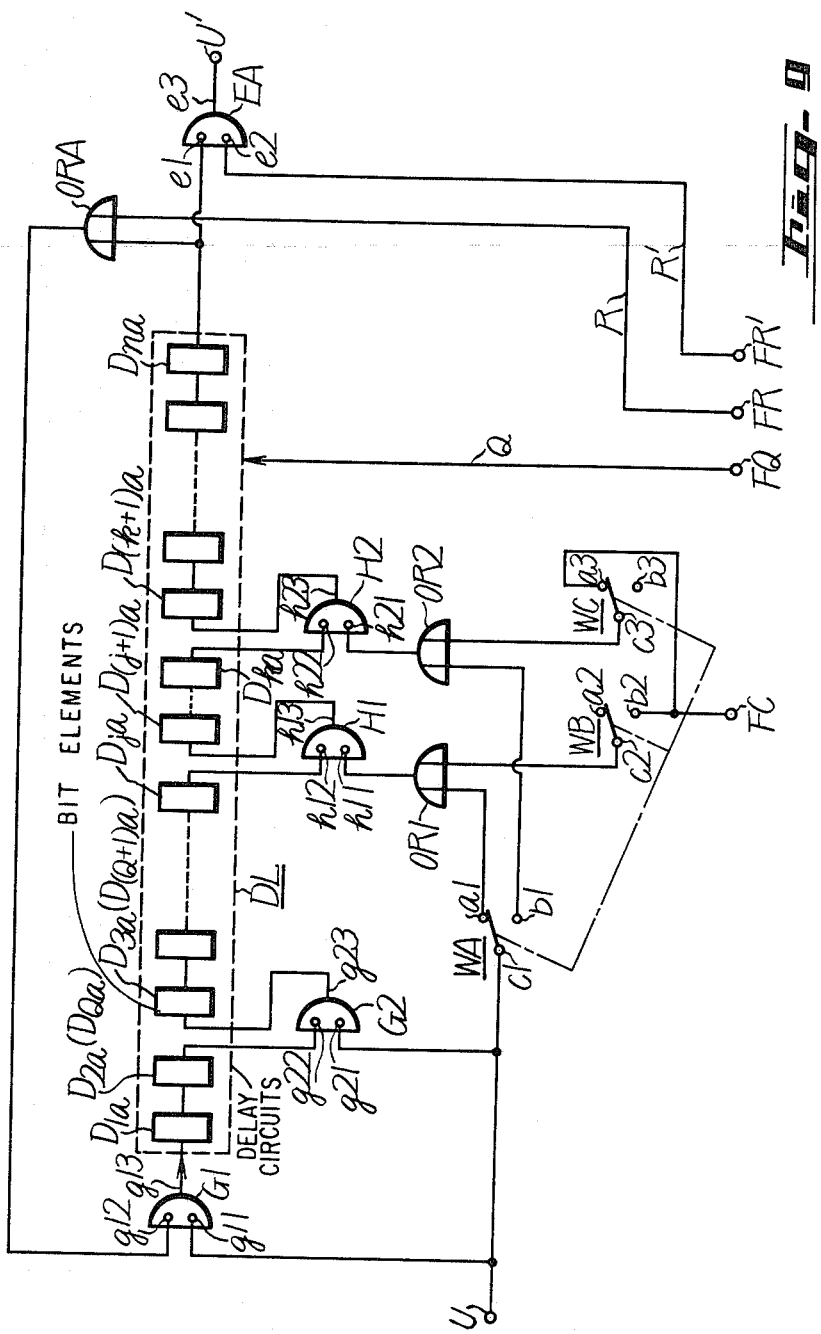

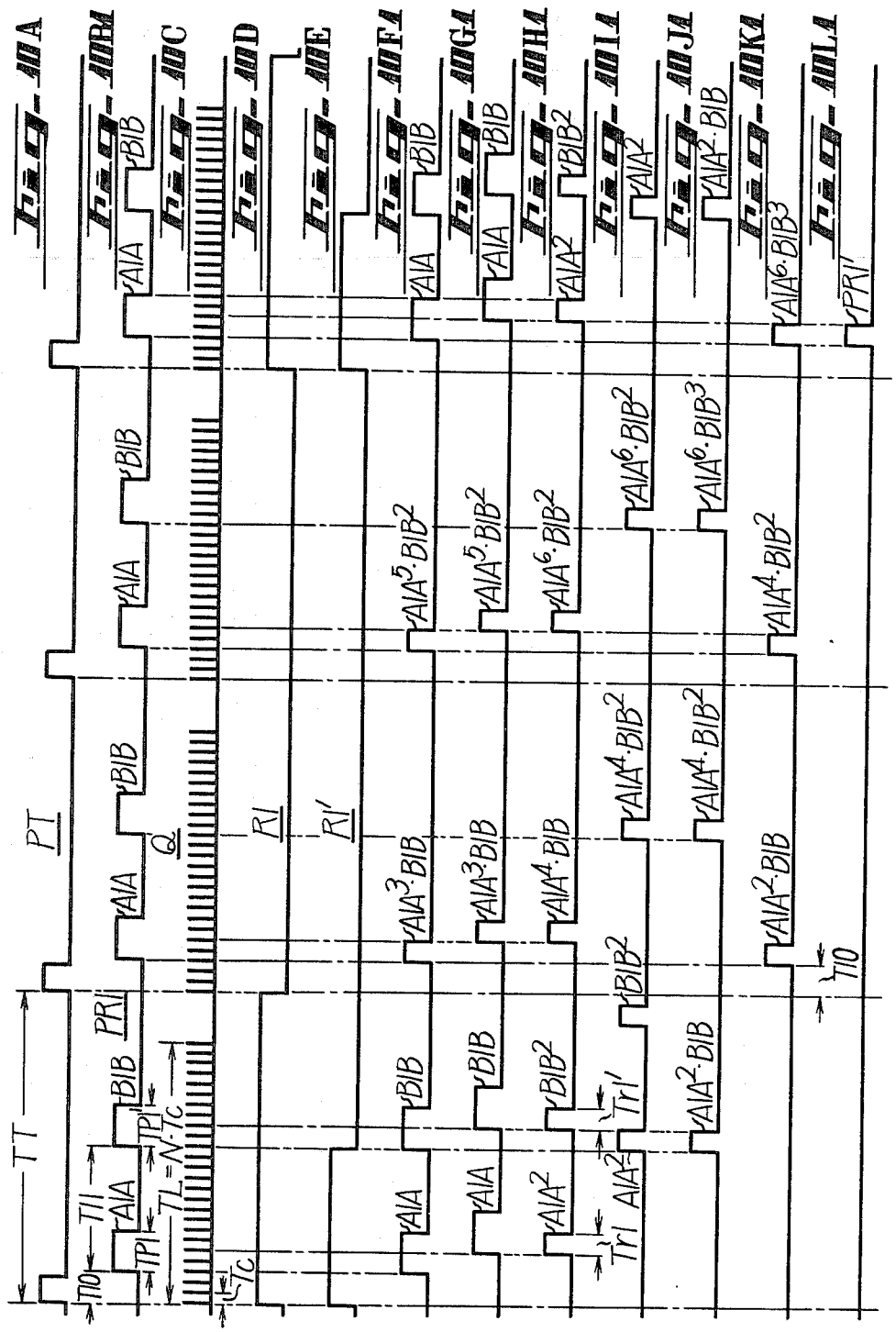

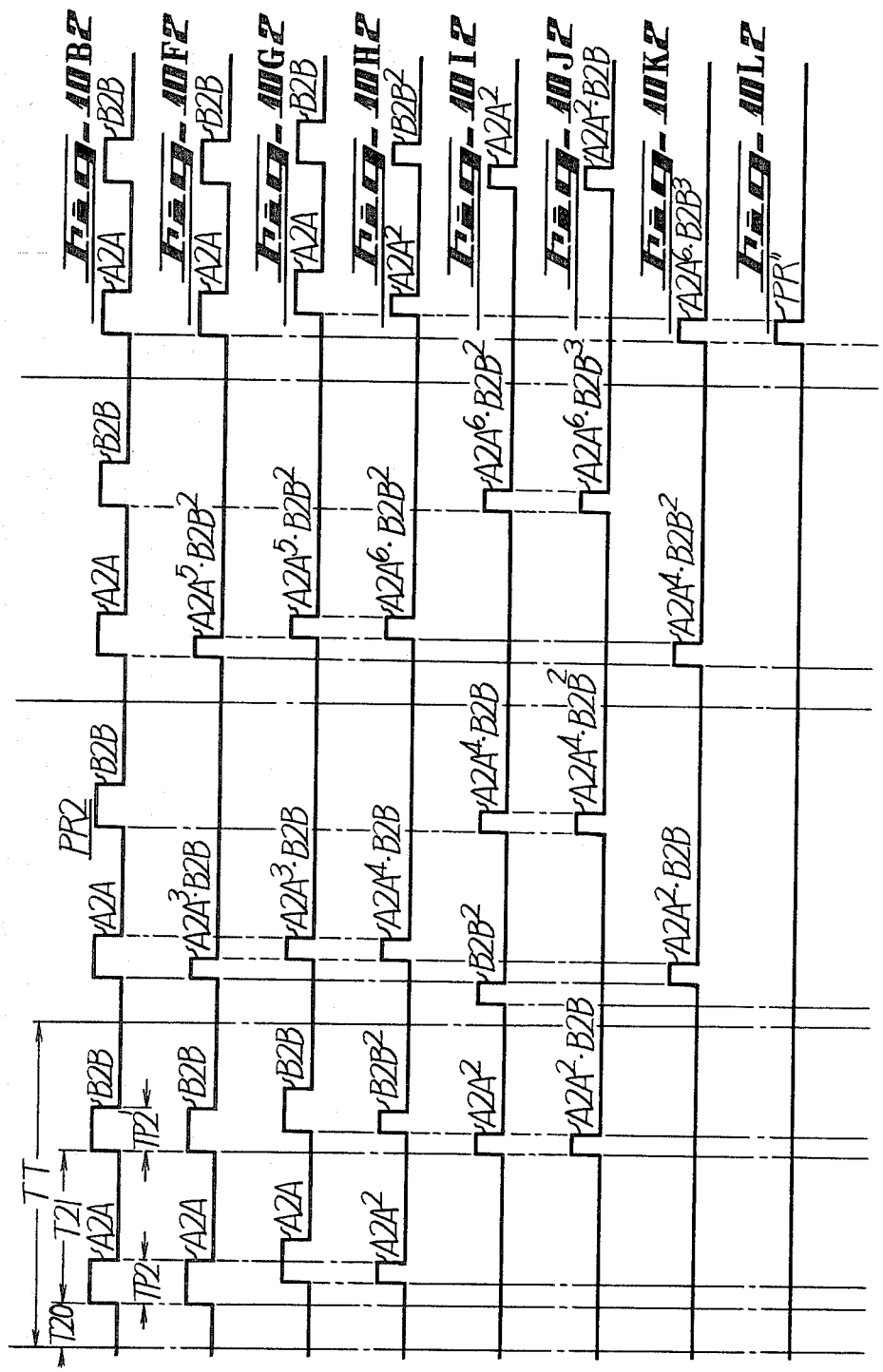

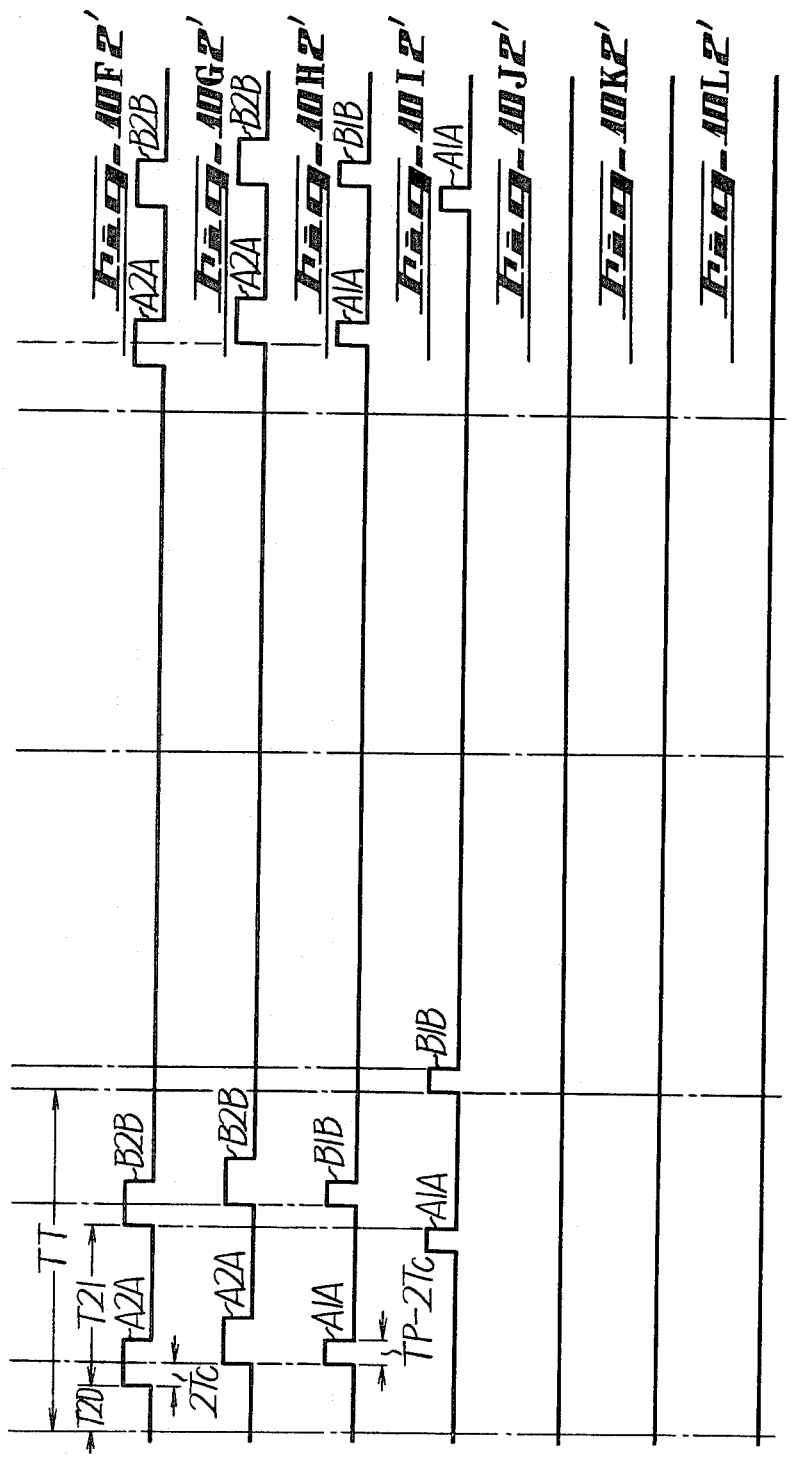

3,697,991

SECONDARY RADAR RECEPTION SYSTEM

BACKGROUND OF THE INVENTION

This invention relates to a secondary radar reception system, that is, the so-called transponder reception system which receives on the side of a primary radar a responded wave transmitted or emitted from a secondary radar in response to a radar pulse from the primary radar and containing a response pulse and an identification pulse delayed a predetermined time behind the response pulse, and produces a multiplied output of the response pulse and the identification pulse and indicates the distance and azimuth of the secondary radar relative to the primary radar based upon the multiplied output.

SUMMARY OF THE INVENTION

The primary object of this invention is to provide a secondary radar reception system which is simple in construction and accurate in operation.

Another object of this invention is to provide a secondary radar reception system which is provided with a special identification circuit.

Other objects, features and advantages of this invention will become apparent from the following description taken in conjunction with the accompanying drawings.

BRIEF DESCRIPTION OF THE DRAWINGS

FIGS. 3A–3L are signal waveform diagrams for explaining the system shown in FIG. 2;

FIG. 4 is a systematic diagram illustrating another example of this invention;

FIGS. 5A–5L are signal waveform diagrams for explaining the system exemplied in FIG. 4;

FIG. 6 is a further example of this invention;

FIGS. 7A–7L are signal waveform diagrams similar to FIGS. 3A–3L;

FIGS. 8A–8L are signal waveform diagrams similar to FIGS. 5A–5L;

FIG. 9 is a systematic diagram illustrating still a further example of this invention; and FIGS. 10A–10L are signal waveform diagrams for explaining the system depicted in FIG. 9.

DESCRIPTION OF THE PREFERRED EMBODIMENTS

Figure 1:
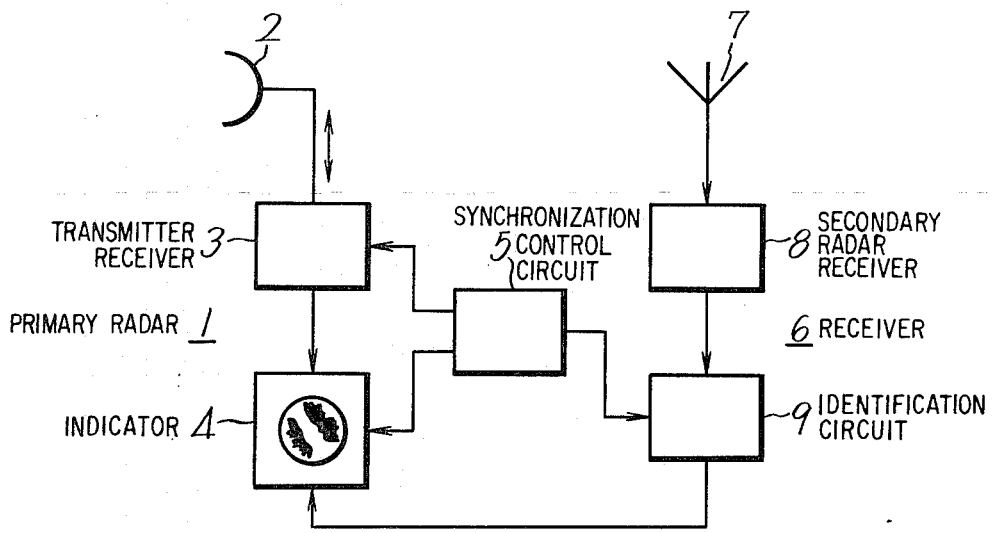
FIG. 1 is a systematic diagram for explaining a secondary radar reception system of this invention.

In FIG. 1 reference numeral 1 indicates generally a primary radar which includes an antenna 2, a transmitter-receiver 3, a radar indicator device 4 and a synchronization control circuit 5 and provides plan-position indication on a display tube of the indicator device 4.

Reference numeral 6 designates generally a receiver device which is provided on the side of the primary radar 1 for receiving an electric wave emitted from a secondary radar (not shown). The receiver device 6 comprises an antenna 7 for receiving a responded from the secondary radar which consists of a response pulse and identification pulses delayed a predetermined time behind the response pulse emitted in response to the reception of a radar pulse transmitted from the primary radar 1, a secondary radar receiver 8 for deriving the aforesaid responded wave received by the antenna 7 and a secondary radar identification circuit 9 which derives a multiplied output of the response pulse and the discriminating pulse of the response wave from the output of the receiver 8 and is controlled by a synchronizing signal from the synchronization control circuit 5 for discriminating the secondary radar signals from others. In the present example the multiplied output of the response pulse and the identification pulses of the responded wave produced by the identification circuit 9 is supplied to the indicator device 4, thereby to indicate on its display tube the distance of the secondary radar from the primary radar, the azimuth of the former relative to the latter and so on.

Since the foregoing construction is well-known in the art, no further detailed description will be given. The present invention relates to the following construction of the identification circuit 9 for deriving the multiplied output of the responded pulse and the identification pulses contained in the responded wave from the output of the receiver 8 receiving the responded wave from the secondary radar.

Figure 2:
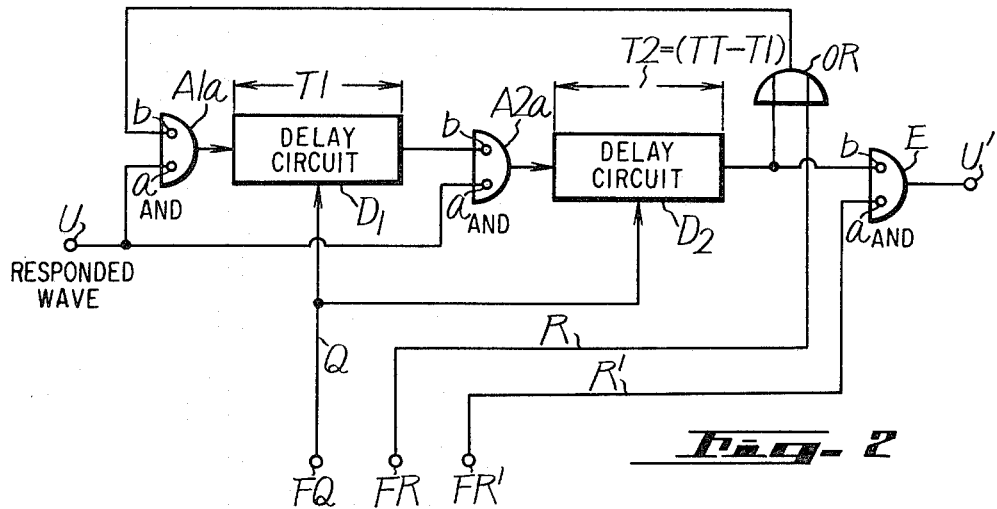
FIG. 2 is a systematic diagram showing one example of this invention.

Let it be assumed for convenience of explanation that the radar pulse emitted from the antenna 2 of the primary radar 1 is a pulse such as indicated by PT in FIG. 3A which has a period TT and that the output of the receiver 8 corresponding to the responded wave emitted from the secondary radar in response to the radar pulse PT and received by the receiver 8 is a pulse such as indicated by PR in FIG. 3B which consists of a response pulse A delayed behind each pulse PT by a time T0 corresponding to the distance between the primary radar and the secondary radar and a discriminating pulse B1 delayed behind the pulse PR by a predetermined time T1. In this invention as shown in FIG. 2 the identification circuit 9 includes a first multiple delay circuit $D_1$ for delaying the responded wave by the time T1 corresponding to the time between the identification pulse B1 and the response pulse A, a second multiple delay circuit $D_2$ for providing a delay of a time T2 which is a difference between the period of the responded pulse A, that is, the period TT of the radar pulse and the time T2 ($T2 = TT - T1$), multiplier circuits A1$a$ and A2$a$ of the "and" circuit construction respectively provided on the input sides of the delay circuits $D_1$ and $D_2$, an "or" circuit OR provided on the input side of the multiplier circuit A1$a$ and an "and" circuit E provided on the output side of the delay circuit $D_2$.

In the present invention the responded wave PR shown in FIG. 3B, which is derived at a terminal U connected to the output side of the secondary radar receiver 8, is supplied to the one input terminal $a$ of each of the first and second multiplier circuits A1$a$ and A2$a$. The output of the multiplier circuit A1$a$ is applied to the input side of the first multiple delay circuit $D_1$, the output of which is, in turn, supplied to the other input terminal $b$ of the second multiplier circuit A2$a$. Further, the output of the second multiplier circuit A2$a$ is fed to the input side of the second multiple delay circuit $D_2$, the output of which is, in turn, applied to the other input terminal $b$ of the first multiplier circuit A1$a$ through the "or" circuit OR and, at the same time, to one input terminal $b$ of the "and" circuit E.

In this case the multiple delay circuits $D_1$ and $D_2$ are of the shift-register construction. At a terminal FQ connected to the synchronization control circuit 5, a clock pulse Q such as shown in FIG. 3C (synchronized with the radar pulse PT) is provided. The clock pulse Q is supplied to the multiple delay circuits $D_1$ and $D_2$ to sequentially shift them. At a terminal FR connected to the synchronization control circuit 5 there is produced a rectangular wave R such as shown in FIG. 3D which is "1" for one period $TT$ of the radar pulse PT, for example, every three periods $3TT$ of the radar pulse in synchronization therewith and the rectangular wave R is applied through the "or" circuit OR to the input terminal $b$ of the multiplier circuit A1$a$. At a terminal FR' connected to the synchronization control circuit 5 there is obtained a rectangular wave R' such as shown in FIG. 3E which is "1" for a time of, for example, $TT/2$ in synchronization with the radar pulse PT in the period during which the rectangular wave R is "1," and the rectangular wave R' is applied to one input terminal $a$ of the "and" circuit E.

The period $3TT$ of the rectangular waves R and R' will hereinafter be referred to as a multiplying period TM and the period TT during which the rectangular waves R and R' are "1" in the period TM. The subsequent period $TT$ and the last period $TT$ will hereinafter be referred to as first, second and third periods. Further, the response pulse A and the identification pulses B1 which are respectively obtained in these periods will be identified as A1, A2, A3 and B11, B12, B13 respectively. With the arrangement described above, in the first period the input terminal $b$ of the multiplier circuit A1$a$ is supplied with the input "1" based upon the output "1" of the rectangular wave R irrespective of the output content of the second multiple delay circuit $D_2$, so that the response pulse A1 and the identification pulse B11 of the responded wave PR from the terminal U are derived at the multiplier circuit A1$a$ in the first period as illustrated in FIG. 3F and the resulting pulses are sequentially fed to the first multiple delay circuit $D_1$. As a result of this, the first multiple delay circuit $D_1$ produces a response pulse A1 and identification pulse B11 such as depicted in FIG. 3G which are respectively delayed behind those A1 and B11 by the time $T1$ and the resulting pulses are applied to the input terminal $b$ of the multiplier circuit A2$a$.

The input terminal $a$ of the multiplier circuit A2$a$ is always supplied with the responded wave PR without delay, so that the circuit A2$a$ produces an output A1·B11 such as shown in FIG. 3H which is obtained by multiplication of the identification pulse B11 with the delayed response pulse A1 of FIG. 3G in the first period.

The multiplied output A1·B11 is supplied to the second delay circuit $D_2$ to derive therefrom an output which has been delayed behind the original multiplied output A1·B11 by the time $T2$ ($T2 = TT - T1$) as shown in FIG. 3I. In this case the delayed multiplied output A1·B11 is produced in the second period and the output of the rectangular wave R is "0" in the second period, so that the delayed multiplied output A1·B11 is supplied to the input terminal $b$ of the first multiplier circuit A1$a$.

In this manner, the delayed multiplied output A1·B11 is applied to the input terminal $b$ of the first multiplier circuit A1a but its other input terminal $a$ is always supplied with the response wave PR, so that the multiplier circuit A1$a$ produces an output A1·B11·A2 such as depicted in FIG. 3F which results from multiplication of the response pulse A2 in the second period by the multiplied output A1·B11.

The resulting multiplied output A1·B11·A2 is applied to the first delay circuit $D_1$ and is thereby delayed by the time T1 and the delayed multiplied output A1·B11·A2 is multiplied by the discriminating pulse B12 of the second period in the multiplier circuit A2$a$, thus producing a multiplied output A1·B11·A2·B12 such as illustrated in FIG. 3H. The multiplied output thus produced is delayed by the delay circuit $D_2$ and is supplied through the "or" circuit OR to the multiplier circuit A1$a$ which produces an output A1·B11·A2·B12·A3 resulting from multiplication of the response pulse A3 of the third period by the delayed multiplied output A1·B11·A2·B12. The resulting multiplied output A1·B11·A2·B12·A3 is delayed by the delay circuit $D_1$ and is multiplied by the identification pulse B13 in the multiplier circuit A2$a$ and is then delayed by the delay circuit $D_2$, thus producing a delayed multiplied output A1·B11·A2·B12·A3·B13. This multiplied output is produced in the first period subsequent to the multiplication period TM, and hence is masked by the output "1" of the rectangular wave R.

Then, in the following multiplication period TM exactly the same operations as those above described are repeatedly performed.

The output of the delay circuit $D_2$ depicted in FIG. 3I is applied to the input terminal $b$ of the "and" circuit E, and the other input terminal $a$ of which is supplied with the rectangular wave R' during the first period $TT$ of the multiplication period TM. Consequently, there is produced at the output terminal U' of the "and" circuit E an "and" output PR' such as shown in FIG. 3J which is composed of the multiplied output A1·B11·A2·B12·A3·B13 and the rectangular wave R'.

The output PR' thus obtained is applied as the output of the identification circuit 9 to the indicator device 4 to indicate on its display tube the distance of the secondary radar from the primary radar and the azimuth. The distance and azimuth determine the position of the secondary radar.

In the secondary radar discriminator circuit exemplified in FIG. 2 the responded wave PR is supplied to the first multiple delay circuit $D_1$ through the "and" circuit A1$a$, the output of the delay circuit $D_1$ and the responded wave PR are supplied to the second multiple delay circuit $D_2$ through the "and" circuit A2$a$ and the output of the delay circuit $D_2$ and the rectangular wave R' are applied to the output terminal U' through the "and" circuit E. Consequently, even if noise is contained in the responded wave PR, the second "and" circuit A2$a$ inhibits the passage therethrough of the noise, so that substantially no noise is contained in the output applied to the output terminal U', thus ensuring accurate detection of the secondary radar.

While this invention has been above described in connection with the case where the responded wave PR consists of the response pulse A and one identification pulse B1 in one period $TT$ of the radar pulse, the invention is applicable to the case where in one period of the radar pulse the response wave PR consists of one response pulse A', a first identification pulse B1' delayed a predetermined time $T1'$ behind the response $A'$, a second identification pulse $B2'$ delayed a predetermined time $T2'$ behind the first identification pulse $B1'$, ..... and an nth identification pulse $Bn'$ delayed a predetermined time $Tn'$ behind a $(n-1)$th identification pulse $B(n-1)'$, that is, n's identification pulses $B1', B2', ..... Bn'$ as a whole. This involves the provision of a first delay circuit $D_1'$ of the time $T1'$, a second delay circuit $D_2'$ of the time $T2'$, ..... an nth delay circuit $D_n'$ of the time $Tn'$ and a $(n+1)$th delay circuit $D_{(n+1)}'$ of the time $T(n+1)'$ corresponding to a time $\{Tr - (T1' + T2' + ..... Tn')\}$, that is, $(n+1)$'s delay circuits $D_1', D_2', ..... D_{n+1}'$ as a whole and the provision of first, second, ..... $(n+1)$th multiplier circuits $A1a, A2a, ..... A(n+1)a'$, that is $(n+1)$'s multiplier circuits as a whole. In such a case, the responded wave PR and the output of the $(n+1)$th delay circuit $D_{(n+1)}'$ are multiplied together by the first multiplier circuit $A1a'$, whose output is applied to the first delay circuit $D_1'$, the responded wave PR and the output of the first delay circuit $D_1'$ are multiplied together by the second multiplier circuit $A2a'$, whose output is applied to the second delay circuit $D_2'$, ....., the responded wave PR and the output of the nth delay circuit $D_n'$ are multiplied together by the $(n+1)$th multiplier circuit $A_{(n+1)a}$ whose output is fed to the $(n+1)$th delay circuit $D_{(n+1)}'$; and a multiplied output of the response pulse $A'$ and the n's identification pulses $B1', B2', ..... Bn'$ in the responded wave PR is derived from the $(n+1)$th delay circuit $D_{(n+1)}'$. In the foregoing n is a positive integer.

FIG. 4 shows another example of this invention as being applied to the case where the number of the discriminating pulses in the responded wave PR is two, that is, $n=2$. Although no detailed description will be given of the illustrated discriminator circuit, its construction and operational effect will be seen from FIGS. 4 and 5. In the present example the multiplication period TM is $3TT$ as is the case with the foregoing example. Two identification pulses B1 and B2 in the first period $TT$ of the multiplication period TM are respectively indicated by B11 and B21 and two identification pulses B1 and B2 in the second period and two identification pulses B1 and B2 in the third period are respectively denoted as B12, B22, and B13, B23. FIGS. 5A to 5E show the same signals as those depicted in FIGS. 2A to 2E, that is, a radar pulse PT, responded pulses PR, a clock pulse Q, and rectangular signals R and R'. FIGS. 5F to 5L respectively illustrate outputs of a multiplier circuit $A1a'$, a delay circuit $D_1$, a multiplier circuit $A2a'$, a delay circuit $D_2$, a multiplier circuit $A3a'$, a delay circuit $D_3'$ and an "and" circuit E.

As has been described in the foregoing, the present invention makes it easy to obtain the multiplied output of the response pulse and the identification pulse contained in the responded wave PR. The invention requires one more delay circuit than the number of identification pulses but the overall time necessary for the operation of the delay circuits corresponds to the period of the radar pulse, so that the overall construction of the identification circuit of this invention can be produced at low cost. Further, if the multiplication period TM is selected to be NTM (N being a positive integer more than 2), the multiplication of the response pulse and the identification pulse is equivalent to the number of multiplications equal to N for each multiplication period, and, in the example of FIG. 4, the two "and" circuits $A2a'$ and $A3a'$ are incorporated into the delay circuit as in the example of FIG. 2 to inhibit the passage therethrough of noise contained in the response wave, so that an accurate multiplied output of the response pulse and the identification pulse can be produced to precisely obtain the distance of the secondary radar from the primary radar and its azimuth.

In the foregoing the multiple delay circuits are of the shift register construction which are driven by the clock pulse Q but the delay circuits may be replaced with, for example, delay lines capable of providing a delay without being driven by a clock pulse.

The foregoing description has been made on the assumption that where the multiple delay circuits are driven by the clock pulse Q, the rise-up times of the response pulse and the identification pulse of the responded wave PR coincide with that of the clock pulse. In practice, however, at times the rise-up times of the response pulse and the identification pulse will be different from that of the clock pulse. In this case if the responded wave PR precedes by a short time $\tau$ that in the case of FIG. 3B as shown in FIG. 3B' in the case of FIG. 2, the response pulse A1 and the identification pulse B11 obtained in the multiplier circuit A1a in the first period of the radar pulse PT of the period TM are earlier by the time $\tau$ than those shown in FIG. 3F as illustrated in FIG. 3F' but the outputs produced by the multiplier circuit A1a, the delay circuit $D_1$, the multiplier A2a, the delay circuit $D_2$ and the "and" circuit E agree with the rise-up time depicted in FIGS. 3F to 3J as illustrated in FIG. 3F' to 3J', with the result that an output PR' is delayed by the time $\tau$ behind the response pulse. This introduces in the indication of the position of the secondary radar an error corresponding to the time $\tau$.

In practice, such an error can be made negligible by minimizing the period $T$ of the clock pulse Q and increasing the bit number of the delay circuits correspondingly. However, where the bit number of the delay circuits is limited to a certain value, an output at the bit position immediately before the last one of the last delay circuit, namely the delay circuit $D_2$ in FIG. 2 is multiplied by the response wave and the resulting multiplied output is utilized as an input to the indicator device 4.

FIG. 6 illustrates another example of this invention which is adapted to eliminate an error such as occurs when there is one discriminating pulse of the responded wave PR as in the case of FIG. 2. In the present example parts corresponding to those in FIG. 2 are identified by the same reference numerals and no detailed description will be repeated. In the figure a multiplier circuit E' is provided in place of the "and" circuit E of FIG. 2 and the output at an $(n-1)$th bit position of the last delay circuit $D_2$ consisting of n's bits is supplied to an input terminal b of the multiplier circuit E', while the responded wave PR derived from the terminal U and the rectangular wave R' from the terminal FR' are respectively applied to the other input terminals a and c of the multiplier circuit E'. However, the output of the delay circuit $D_2$ fed to the multiplier circuit A1a is produced at the last bit position, that is, at the nth bit position of the delay circuit $D_2$.

Thus, there is produced at the (N − 1)th bit position of the delay circuit $D_2$ an output such as depicted in FIG. 3K which is advanced by one bit time, that is, one period $T_C$ of the clock pulse Q further than the output of the delay circuit $D_2$, that is, the output at the Nth bit position shown in FIG. 3I and 3I'. As a result, the multiplier circuit E' produces an output PR" such as shown in FIG. 3L which rises up at the time when the response pulse A of the responded wave PR is produced. Consequently, the position of the secondary radar can be indicated on the indicator tube of the indicator device 4 without the aforementioned error.

If there are n identification pulses, the indication can be provided without error.

Further, the identification circuit of this invention can be constructed in such a manner as to obtain a multiplied output of the output of the delay circuit at its ($n − 1$)th bit position and the response pulse of the responded wave without applying the rectangular signal R' to the multiplier circuit E'.

Although the foregoing description has been made in connection with the case where the radar pulse emitted from the primary radar 1 has the period $TT$ and the delay of the period $TT$ is produced by the overall series connection of the delay circuits employed, the pulse intervals of the radar pulse need not to be of the same period $TT$ and, the radar pulse is only required to be periodic. In this case the circuit connections are such that after a predetermined number of shift pulses Q is continuously produced for each radar pulse for a time $TL$ and the delivery of the shift pulse Q is rendered intermittent to enable a delay of the time $TL$ to be produced by the series connection of the delay circuits. In the example above described with FIG. 2 the delay time $T2$ of the delay circuit $D_2$ is selected such that $T2 = TL − T1$ and in the example of FIG. 4 the delay time $T3$ of the delay circuit $D_3'$ is similarly selected such that $T3 = TL − (T1 + T2)$. FIG. 7 shows signals appearing at the respective circuit point corresponding to those in FIG. 4 when the delay time $T2$ of the delay circuit $D_2$ has been selected as $T2 = TL − T1$ in FIG. 2 and FIG. 8 illustrates signals produced at the respective circuit points corresponding to those in FIG. 5 when the delay time $T3$ of the delay circuit $D_3'$ has been selected as $T3 = TL − (T1 − T2)$ in FIG. 4. It is a matter of course to effect other various modifications and variations.

FIG. 9 illustrates another modification of the secondary radar identification circuit 9 of this invention. The following description will be made on the assumption that a radar pulse PT emitted from an antenna 2 of a primary radar 1 is obtained at time intervals $TT$ as shown in FIG. 10A, also, that an output PR1 of a receiver 8 receiving a responded wave emitted from a first secondary radar in response to the radar pulse PT consists of a first response pulse A1A delayed behind the radar pulse PT by a time T10 corresponding to the distance between the primary radar and the first secondary radar and a first discriminating pulse B1B delayed behind the response pulse A1A by a predetermined time T11 as depicted in FIG. 10B1. Also, that an output PR2 of the receiver 8 receiving an responded wave emitted from a second secondary radar consists of a second response pulse A2A delayed behind the radar pulse PT by a time T20 corresponding to the distance between the primary radar and the second secondary radar and a second identification pulse B2B delayed behind the second response pulse A2A by a predetermined time T21 as depicted in FIG. 10B2. The widths of the first and second response pulses A1A and A2A are respectively indicated by TP1 and TP2 and those of the first and second discriminating pulses B1B and B2B are respectively designated by TP1' and TP2'. For convenience, these pulse widths are selected such that $TP1 = TP2 = TP1' = TP2' = TP$. Assume that the width $TP$ has a longer time duration than a bit unit time $T_C$ shown in FIG. 10C of a delay circuit which will be described later. Further, let it be assumed that the difference between the delay time T11 and T21 is smaller than the pulse width $TP$ but greater than the bit unit time $T_C$.

In such a case the discriminator circuit 9 examplified in FIG. 9 includes a delay circuit DL having first to nth bit elements $D_{1a}$, $D_{2a}$, ..... $D_{na}$, each providing a predetermined delay time TL which is shorter than the shortest possible time between adjacent pulses of the radar pulse PT shown in FIG. 10A. The bit elements $D_{1a}$, $D_{2a}$, ..... $D_{na}$ of the delay circuit DL are connected together in the form of a shift register and the delay circuit DL is driven by n clock pulses Q which are sequentially produced at time intervals of the bit unit time $T_C$ for each radar pulse PT in synchronization therewith, as shown in FIG. 10C, which is supplied to a terminal FQ connected to a synchronizing signal source 5. Consequently, the overall delay time TL of the delay circuit DL is given by $TL = T_C \cdot n$ with n being naturally a positive integer.

The input side of the first bit element $D_{1a}$ of the delay circuit DL is connected to an output side g13 of a multiplier circuit G1 of the "and" circuit construction and the one input terminal g11 of the multiplier circuit G1 is connected to a terminal U connected to the output side of the secondary radar receiver 8. Further, the output side of the nth bit element $D_{na}$ of the delay circuit DL is connected to the one input terminal of an "or" circuit ORA and to the one input terminal e1 of an "and" circuit EA and the output side of the "or" circuit ORA is connected to the other input terminal g12 of the multiplier circuit G1 and the output terminal e3 of the "and" circuit EA is connected to an output terminal U'. The output terminal U' is connected to the radar indicator device 4 shown in FIG. 1.

A multiplier circuit G2 is interposed between a Qth bit element $D_{Qa}$ and a (Q + 1th bit element $D_{(Q+1)}$, the bit element $D_{Qa}$ corresponding to the greatest possible number Q ($Q = (TP − T_C)/T_C > 0$ and is an integer smaller than n) of the bit unit time $T_C$ capable of satisfying the time TQ which is smaller or equal to the difference ($TP − T_C$) between the pulse width $TP$ of each of the first and second response waves and the bit unit time $T_C$, that is, $T_C < TQ \leq (TP − T_C)$ and the multiplier circuit G2 having its one input terminal g22 connected to the output side of the Oth bit element $D_{Qa}$, the other input terminal g21 connected to the terminal U and its output terminal g23 connected to the input side of the (Q + 1)th bit element $D_{(Q+1)a}$. If $TP = 4T_C$, $TQ$ can be made to be $2T_C$ or $3T_C$ and accordingly Q is 2 or 3 because $T_C < TQ \leq (TP − T_C)$. If $TQ$ is $2T_C$, Q is 2, so that the Qth bit element $D_{Qa}$ is $D_{2a}$ and the bit element $D_{(Q+1)a}$ is $D_{3a}$ as illustrated in FIG. 9. Consequently, between the bit elements $D_{2a}$ and $D_{3a}$ is interposed the multiplier circuit G2 having its one input terminal g22 connected to the output side of the bit element $D_{2a}$, the other input terminal g21 connected to the terminal U and the output terminal g23 connected to the input side of the bit element $D_{3a}$.

Further, a multiplier circuit H1 of the "and" circuit construction is interposed between a jth bit element $D_{ja}$ and a $(J+1)$th bit element $D_{(j+1)a}$, the bit element $D_{ja}$ producing an output delayed behind that of the first bit element $D_{1a}$ by a time T11 which is the delay time between the response pulse A1A and the discriminating pulse B1B of the first response wave PR1 and the multiplier circuit H1 having its one input terminal h12 connected to the output side of the jth bit element $D_{ja}$, the other input terminal h11 connected to the output side of an "or" circuit OR1 described later and the output terminal h13 connected to the input side of the $(j+1)$th bit element $D_{(j+1)a}$.

In addition, another multiplier circuit H2 of the "and" circuit construction is connected between a kth bit element $D_{ka}$ and a $(k+1)$th bit element $D_{(K+1)a}$, the bit element $D_{ka}$ producing an output delayed behind that of the first bit element $D_{1a}$ by a time T21 which is the delay time between the response pulse A2A and the discriminating pulse B2B of the second response wave PR2 and the multiplier circuit H2 having its one input terminal h22 connected to the output side of the kth bit element $D_{ka}$, the other input terminal h21 connected to the output side of an "or" circuit OR2 described later and the output terminal h23 connected to the input side of the $(k+1)$th bit element $D_{(K+1)a}$.

In the delay circuit DL the output side of the first bit element $D_{1a}$ is connected to the input side of the second bit element $D_{2a}$, the bit elements $D_{3a}$, $D_{4a}$, ..... $D_{ja}$ are cascaded, the bit elements $D_{(j+1)a}$, $D_{(j+2)a}$a..... $D_{ka}$ are similarly cascaded and the bit elements $D_{(k+1)a}$, $D_{(k+2)a}$, ..... $D_{na}$ are likewise cascaded. Accordingly, in the delay circuit DL the bit elements are arranged in the order of $D_{1a}$ $-D_{2a}$ $-D_{3a}$ ..... $D_{ja}-D_{(j+1)a}$ ..... $D_{ka}-D_{(k+1)a}$ ..... $D_{na}$ and the multiplier circuits G2, H1 and H2 are respectively interposed in a cascade connection between the bit elements $D_{2a}$ and $D_{3a}$, and also between $D_{ja}$ and $D_{(j+1)a}$ and between $D_{ka}$ and $D_{(k+1)a}$. The clock pulse Q as shown in FIG. 10C is supplied from the terminal FQ to a delay circuit DL comprised of the bit elements $D_{1a}$ to $D_{na}$. The delay circuit DL provides a total delay time $TL$ ($TL = n \cdot T_C$).

At the terminal FR connected to the synchronizing control circuit 5 there is derived a rectangular wave R1 such as depicted in FIG. 10D which is produced every third radar pulse PT in synchronization therewith and has a width corresponding to the intervals between two adjacent radar pulses PT, the resulting rectangular wave R being applied through the "or" circuit ORA to the input terminal g12 of the multiplier circuit G1. Further, at the terminal FR' connected to the synchronization control circuit 5 there is derived a rectangular wave R1' such as shown in FIG. 10E which is produced every third radar pulse PT in synchronization therewith and has a width of, for example, ½TT smaller than the period $TT$ between adjacent radar pulse PT, the rectangular wave R1' being fed to an input terminal e2 of the "and" circuit EA.

In FIG. 9 reference characters WA, WB and WC designate ganged switches. The terminal U is connected to the input terminal h11 of the multiplier circuit H1 through a moving contact c1 and a fixed contact a1 of the switch WA and the "or" circuit OR1 and, at the same time, the terminal U is connected to the input terminal h21 of the multiplier circuit H2 through the moving contact c1 and a fixed contact b1 of the switch WA and the "or" circuit OR2. At, the terminal FC a control output "1" always occurs because the logic is such that the signal FC is 1. Terminal FC is connected through a fixed contact b2 and a moving contact c2 of the switch WB to the "or" circuit OR1 and further to the input terminal h11 of the multiplier circuit H1 while being, at the same time, connected through a fixed contact A3 and a moving contact c3 of the switch WC to the "or" circuit OR2 and further to the input terminal h21 of the multiplier circuit H2.

A description will be given of the operation of the discriminator circuit 9 of the above construction on the assumption that the moving contacts C1, c1, c2 and c3 of the switches WA, WB and WC lie on the contacts a1, a2 and a3 as illustrated in FIG. 9 during the reception of the first response wave from the first secondary radar. Let it be assumed that the period between the radar pulse and a pulse adjacent thereto in which the rectangular wave R1 is produced is a first period, that the periods between the following adjacent pulses are second and third periods and that these three periods repeat. If the output "1" of the rectangular wave R1 is produced in the first period, the input terminal g12 of the multiplier circuit G1 is supplied with an input "1" based upon the output "1". Consequently, in the first period the multiplier circuit G1 derives therefrom the response pulse A1A and the discriminating pulse B1B of the response wave PR1 from the terminal U as shown in FIG. 10F1 and these pulses are sequentially applied to the bit element $D_{1a}$ of the delay circuit DL. As a result, there is obtained at the output side of the Qth bit element $D_{Qa}$, in the example of FIG. 9 the bit element $D_{2a}$ pulses A1A and B1B such as shown in FIG. 10G1 which are delayed behind those A1A and B1B in the first period depicted in FIG. 10F1 by two bit times $2 \cdot T_C$ and the resulting pulses are supplied to the input terminal g22 of the multiplier circuit G12.

The other input terminal g21 of the multiplier circuit G2 is supplied with the response wave PR1 from the terminal U, so that the multiplier circuit G2 produces multiplied outputs $A1A^2$ and $B1B^2$ of the pulses A1A and B1A in the first periods of FIGS. 10B1 and 10G1 as shown in FIG. 10H1. If the widths of the multiplied outputs $A1A^2$ and $B1B^2$ are respectively taken as $Tr1$ and $Tr1'$, $Tr1 = TP1 - 2 \cdot T_C$ and $Tr1' = TP1' - 2 \cdot T_C$. These widths are narrower than those of the pulses A1A and B1B. The multiplied outputs $A1A^2$ and $B1B^2$ are respectively produced at times $(T10 + 2 \cdot T_C)$ and $(T10 + 2 \cdot T_C + T11)$.

Then, the multiplied outputs $A1A^2$ and $B1B^2$ depicted in FIG. 10H1 are applied to the $(Q+1)$th bit element $D_{(Q+1)}$, in the example of FIG. 9 the bit element $D_{3a}$, to produce multiplied outputs $A1A^2$ and $B1B^2$ such as depicted in FIG. 10I1 which are respectively delayed by the time T11 behind the pulses A1A and B1B of the first period of FIG. 10B1, and the resulting multiplied outputs are sequentially supplied to the input terminal h12 of the multiplier circuit H1.

The other input terminal h11 of the multiplier circuit H1 is supplied with the response wave PR1 from terminal U through the moving contact $c1$ and fixed contact $a1$ of the switch WA and through the "or" circuit OR1 which has no delay. The multiplier circuit H1 produces a multiplied output $A1A^2 \cdot B1B$ from the pulse B1B of FIG. 10B1 and the multiplied output $A1A^2$ from the first period as shown in FIG. 10I1.

The multiplied output $A1A^2 \cdot B1B$ is applied to the $(j+1)$th bit element $D_{(j+1)a}$ and, the input terminal $h21$ of the multiplier circuit H2 is supplied with the output "1" from the terminal FC through the fixed contact $a3$ and the moving contact $c3$ of the switch WC and the "or" circuit OR2, so that the multiplied output $A1A^2 \cdot B1B$ is applied through the multiplier circuit H2 to a bit element $D_{(K+1)a}$ and is stored and memorized in bit elements $$D_{\left(n-\frac{T10}{T_C}\right)_a} \text{ and } D_{\left(n-\frac{T10}{T_C}+1\right)_a}$$

preceding the bit element $D_{na}$ by numbers represented by $$n-\frac{T10}{T_C} \text{ and } n-\frac{T10}{T_C}+1,$$

thus completing the first period. In the second period the output $A1A^2 \cdot B1B$ stored in the first period is transferred by the clock pulse produced with the radar pulse PT as the reference, with the result that after a time T10 from the starting time the bit element $D_{na}$ produces as its output the multiplied output $A1A^2 \cdot B1B$ having a width $(TP - 2 \cdot T_C)$ at the time when the pulse A1A of FIG. 10B1 in the second period is produced. This is shown in FIG. 10K1. When the output of the rectangular wave R1 is "0" during the second period, the multiplied output $A1A^2 \cdot B1B$ shown in FIG. 10K1 is supplied to the input terminal $g12$ of the multiplier circuit G1.

In this manner, the multiplied output $A1A^2 \cdot B1B$ shown in FIG. 10K1 is applied to the input terminal $g12$ of the multiplier circuit G1, while the response wave PR1 is supplied to the other input terminal $g11$ of the circuit G1. Accordingly, the multiplier circuit G1 produces a multiplied output $A1A^3 \cdot B1B$ of the pulse A1A and the multiplied output $A1A^2 \cdot B1B$ in the second period as illustrated in FIG. 10F1.

Then, the multiplied output $A1A^3 \cdot B1B$ is applied to the first bit element $D_{1a}$ and the Qth bit element $D_{Qa}$ produces a multiplied output $A1A^3 \cdot B1B$ such as shown in FIG. 10G1 which is delayed behind the original multiplied output $A1A^3 \cdot B1B$ by the time $2 \cdot T_C$ and the delayed multiplied output $A1A^3 \cdot B1B$ is applied to the multiplier circuit G2. While, the multiplier circuit G2 is supplied with the response wave PR1, and hence produces a multiplied output $A1A^4 \cdot B1B$ depicted in FIG. 10H1 which results from multiplication of the pulse A1A of the second period and the multiplied output $A1A^3 \cdot B1B$ of FIG. 10G1. This multiplied output $A1A^4 \cdot B1B$ is delayed by the jth bit element $D_{ja}$ as shown in FIG. 10I1 and is then applied to the multiplier circuit H1 of FIG. 9. The multiplier circuit H1 is supplied with the response wave PR1, and produces a multiplied output $A1A^4 \cdot B1B^2$ such as shown in FIG. 10J1 which results from multiplication of the pulse B1B of the second period and the multiplied output $A1A^4 \cdot B1B$ depicted in FIG. 10I1. This multiplied output $A1A^4 \cdot B1B$ is applied to bit elements preceding the bit element $D_{na}$ designated by $$n-\frac{T10}{T_C} \text{ and } n-\frac{T10}{T_C}+T_C$$

and the applied output is thereby memorized, thus completing the second period.

In the third period of delayed output $A1A^4 \cdot B1B^2$ is applied from the bit element $D_{na}$ through the "or" circuit ORA to the multiplier circuit G1 in the same manner as in the second period, from which circuit is derived a multiplied output $A1A^5 \cdot B1B^2$ resulting from multiplication of the pulse A1A of the third period and the multiplied output $A1A^4 \cdot B1B^2$ depicted in FIG. 10K1. The resulting multiplied output $A1A^5 \cdot B1B^2$ is delayed by the bit element $D_{Qa}$ as depicted in FIG. 10G1 and is fed to the multiplier circuit G2, from which is derived a multiplied output $A1A^6 \cdot B1B^2$ such as illustrated in FIG. 10H1 which results from multiplication of the output $A1A^5 \cdot B1B^2$ shown in FIG. 10G1 and the pulse A1A of the third period. The multiplied output $A1A^6 \cdot B1B^2$ is delayed by the bit element $D_{ja}$ as shown in FIG. 10I1 and is supplied to the multiplier circuit H1, from which is derived a multiplied output $A1A^6 \cdot B1B$ such as shown in FIG. 10J1 resulting from multiplication of the pulse B1B of the third period and the multiplied output $A1A^6 \cdot B1B^2$. The resulting multiplied output $A1A^6 \cdot B1B^3$ is memorized by predetermined bit elements as in the previous periods and the third period is thus completed. In a first period subsequent to the above third period the multiplied output $A1A^6 \cdot B1B$ is caused to start its transfer by the clock pulse starting with the radar pulse PT and is obtained after the elapse of time T10 from the starting time as depicted in FIG. 10K1.

The multiplied output $A1A^6 \cdot B1B^3$ of the subsequent first period shown in FIG. 10K1 is to be applied to the multiplier circuit G1 through the "or" circuit ORA. However, in this first period the rectangular wave R1 is applied to the multiplier circuit G1 through the "or" circuit ORA, thereby inhibiting the application of the multiplied output $A1A^6 \cdot B1B^3$ to the multiplier circuit G1.

Thus, the operations above described are repeatedly carried out to produce the multiplied output $A1A^6 \cdot B1B^3$ during each first period.

The multiplied output $A1A^6 \cdot B1B^3$ produced in each first period is supplied to the input terminal $e1$ of the "and" circuit EA and, on the other hand, the output "1" of the rectangular wave R1' of the first period is applied to the other input terminal $e2$, thereby deriving at the output terminal $e3$ an output PR1' based upon the multiplied output $A1A^6 \cdot B1B^3$ as illustrated in FIG. 3L1.

The resulting output PR1' is applied to the indicator device 4 as an output of the discriminator circuit 9, and the distance and azimuth of the first secondary radar are indicated on the display tube of the indicator device 4.

The foregoing description has been given for the reception of the first response wave of the first secondary radar. For the reception of the second response wave from the second secondary radar the moving contacts $c1$, $c2$ and $c3$ of the switches WA, WB and WC are respectively moved down to the contacts $b1$, $b2$ and $b3$ and the multiplier circuit H2 is used in place of the circuit H1 or vice versa. Accordingly, the same operations as described above are carried out by replacing the multiplier circuit H1 with H2 and H2 with H1, the response wave PR1 with PR2, the pulses A1A and B1B with A2A and B2B, the bit elements $D_{ja}$ and $D_{(j+1)a}$ with $D_{ka}$ and $D_{(k+1)a}$, the "or" circuit OR1 with OR2 and the times $T10$ and $T11$ with $T20$ and $T21$ in the foregoing. Thus, an output PR2' based upon a multiplied output $A2A^6 \cdot B2B$ is derived at the output terminal U' of the "and" circuit EA. The output is supplied to the indicator device 4 to indicate on its display tube the distance and azimuth of the second secondary radar with respect to the primary radar. For the sake of brevity, the waveforms appearing at the respective circuit elements in the reception of the response wave from the second secondary radar, which correspond to those in the reception of the response wave from the first secondary radar shown in FIGS. 10F1 to 10L1, are illustrated in FIG. 10F2 to 10L2 and no further detailed description will be given of the operations in the reception of the response wave from the second secondary radar.

As will be apparent from the foregoing, the present example shown in FIG. 9 enables satisfactory reception of both of the first response wave of the first secondary radar and the second response wave of the second secondary radar through the use of the discriminator circuit 9.

In accordance with this invention, even if the second (or first) response wave from the second (or first) secondary radar has arrived at the discriminator circuit 9 during the reception of the first (or second) response wave from the first (or second) secondary radar, no multiplied output based upon the second (or first) response wave is derived at the output terminal U'. This is true not only in the case where the difference ($T11 - T21$) between the time difference $T11$ between the response pulse A1A and the discriminating pulse B1B of the first response wave from the first secondary radar and the time difference $T21$ between the response pulse A2A and the discriminating pulse B2B of the second response wave from the second secondary radar is greater than the pulse width $TP$ of each of these pulses but also in the case where the time difference ($T11 - T21$) is smaller than the pulse width $TP$. This is true so long as the time difference ($T11 - T21$) is greater than the bit unit time $T_C$ of the clock pulse $Q$.

This is because in the present invention the multiplier circuit G2 is interposed between the $Q$th bit element $D_{Qa}$ and the $(Q+1)$th bit element $D_{(Q+1)a}$ and a pulse of narrow width, in the foregoing example the pulse A1A of a width ($TP - 2 \cdot T_C$) is derived from the multiplier circuit G2 in response to the response pulse A1A (or B1B) of the first period at the time when the response pulse is obtained. The time difference ($T11 - T21$) between the pulses A1A and B1B of the first response wave PR1 and the time difference between the pulses A2A and B2B of the second response wave PR2 is such that $T_C < (T11 - T12) < TP$. This will hereinbelow be explained on the assumption that the second response wave has reached the discriminator circuit during the reception of the first response wave.

In this case the second response wave PR2, shown in FIG. 10B2 is applied to the multiplier circuit G1 in the first period as previously described, from which circuit are derived pulses A2A and B2B as depicted in FIG. 10F2'. While, the bit element $D_{Qa}$ produces pulses A2A and B2B such as shown in FIG. 10G2' which are delayed by the time $2 \cdot T_C$ behind the pulses A2A and B2B depicted in FIG. 10F2'. The delayed pulses A2A and B2B are supplied to the multiplier circuit G2, while the response wave PR2 shown in FIG. 10B2 is fed to the multiplier circuit G2, so that pulses A1A and B1B, each having a width ($TP - 2 \cdot T_C$), are obtained at the time when the pulses A2A and B2B depicted in FIG. 10G2' are produced, as shown in FIG. 10H2' and these pulses A1A and B1B are derived at the output side of the ($j + 1$)th bit element $D_{ja}$ at a time delayed by $T11$ behind the time when the pulse A2A depicted in FIG. 10B2 is produced, as illustrated in FIG. 10I2', and then the resulting pulses are applied to the multiplier circuit H1. However, the pulse A2A of FIG. 10B2 is not produced in the period in which the pulse A1A of FIG. 10I2' is produced, as shown in FIG. 10J2' (($T11 - T12$) = $2 \cdot T_C$), so that no multiplied output is derived from the multiplier circuit H1. This results in that no multiplied outputs are produced in the following second and third periods as illustrated in FIGS. 10K2' and 10L2'.

In the event that the multiplier circuit G2 interposed between the $Q$th bit element $D_{Qa}$ and the $(Q+1)$th bit element $D_{(Q+1)a}$ is left out and instead these bit elements are directly cascaded in the example of FIG. 9, if the second (or first) response wave has come during the reception of the first (or second) response wave, a multiplied output based upon the second response wave is produced.

Accordingly, in the present invention, if the widths of the response pulse and the discriminating pulse are constant in the establishment of the time difference between the response pulse and the discriminating pulse of the response wave from the secondary radar, the time difference between the response pulse and the discriminating pulse can be selected to be large, so that even when there are many secondary radars, their positions can be discriminated. Further, when the number of the secondary radars is definite, the pulse interval of the radar pulse from the primary radar is selected to be short to enable many repeating numbers of the response waves from the secondary radars, to be obtained so that the azimuth and distances to the secondary radars can be accurately obtained.

Although the foregoing description has been given in connection with the case where the relationships between the widths $TP1$ and $TP1'$ of the response pulse A1A and the discriminating pulse B1B of the first response wave and those $TP2$ and $TP2'$ of the response pulse A2A and the discriminating pulse B2B of the second response wave are selected such that $TP1 = TP2 = TP1' = TP2' = TP$, is is also possible that $TP1 = TP2$ and that $TP1' \neq TP2'$. In this case the aforesaid number Q is calculated on the assumption that $TP1 = TP2 = TP$ and the bit elements between which the multiplier circuit G2 is to be interposed are determined on the calculated Q. However, it is necessary that $TP1' > Q \cdot T_C$ and that $TP2' > Q \cdot T_C$.

It is also possible to select pulses such that $TP1' = TP2'$ and that $TP1 \neq TP2$ in which case Q is calculated based on $TP1' = TP2' = TP$ and the position of the multiplier circuit G2 is likewise determined on the basis of the calculated Q. Also in this case, it is necessary that $TP1 > QT_C$ and that $TP2 > Q \cdot T_C$.

While the present invention has been described in connection with the case where each of the first and second response waves consists of one response pulse and one discriminating pulse, the invention may be used for the response wave containing one response pulse and a plurality of discriminating pulses. For example, in the case where the response wave comprises one response pulse, a first discriminating pulse delayed behind the response pulse by a first time and a second discriminating pulse delayed behind the first discriminating pulse by a second time. For this case a first multiplier circuit (corresponding to the multiplier circuit H1 or H2 in FIG. 9) is interposed between a bit element capable of producing an output delayed by the first time behind that of the first bit element and a bit element subsequent to the former bit element and a second multiplier circuit is interposed between a bit element capable of providing an output delayed by the second time behind that of the bit element supplied with the output of the first multiplier circuit and a bit element subsequent thereto to provide a discriminator circuit. Also, a multiplier circuit (corresponding to the multiplier circuit G2 in FIG. 2) is interposed between $Q$th and $(Q + 1)$th bit elements, thus obtaining the same operational effects as above described.

Further, it will be seen that this invention is applicable where a multiplier circuit is provided on the input side of a delay circuit, the response wave is applied through the multiplier circuit to the input side of the delay circuit; the final output of the delay circuit is fed back to the multiplier circuit on the input side of the delay circuit and the response wave is applied to the multiplier circuit to repeatedly produce multiplied outputs of the response pulse and the discriminating pulse. A multiplied output from the final position of the delay circuit and one from its intermediate position is multiplied, thereby producing a multiplied output of the response pulse and the discriminating pulse.

It will be apparent that many modifications and variations may be effected without departing from the scope of the novel concepts of this invention.

We claim as our invention

1. In a secondary radar reception system comprising:
   a primary radar device including an antenna;
   a transmitter-receiver and a radar indicating device;
   a secondary radar receiver including an antenna receiving a response wave transmitted from a secondary radar in response to a radar signal transmitted from the primary radar device;
   a receiver for receiving the response wave received by the antenna and an identification circuit consisting of at least two series connected multiple delay circuits;
   "and" circuits connected to the input side of the first delay circuit and to the output side of the last delay circuit and between each delay circuit and an "or" circuit connected to the output side of the last delay circuit;
   a synchronization control circuit connected between the primary radar device and the secondary radar receiver and supplying a first input signal to the "and" circuit connected to the output side of the last delay circuit and to said "or" circuit and to said first delay circuit, the output of said "or" circuit connected to the "and" circuit at the input of said first delay circuit, the response wave transmitted from the secondary radar being supplied to said "and" circuits at the inputs of said delay circuits, the output of the first stage delay circuit being supplied to a second input terminal of the "and" circuit connected between the first and second delay circuits, the output of the last delay circuit being supplied to a first input terminal of the "and" circuit connected to the output of said last delay circuit and to a first input terminal of said "or" circuit.

2. A secondary radar reception system as claimed in claim 1 in which the last delay circuit consists of N's cascaded delay elements, the output of an $(N-n)$th one of the delay elements and the response wave from the secondary radar being applied to the "and" circuit connected to the output of the last delay circuit where N and $n$ are positive integers and $N > n > 0$, thereby to obtain the rise-up time of the response wave.

3. A secondary radar reception system as claimed in claim 1 in which said first delay circuit consists of N's delay elements, the output of an $n$th one of the delay elements ($N > n > 0$ and N and $n$ being positive integers) being connected to the first input terminal of the "and" circuit at the output of said first delay circuit, the response wave being applied to the other input terminal of said "and" circuit and the output of said "and" circuit being supplied to an $(n + 1)$th one of the delay elements.

4. A secondary radar reception system as claimed in claim 1 in which the response wave is supplied to a second input terminal of the "and" circuit at the outputs of said delay circuits through a switching circuit and an "or" circuit.

5. A secondary radar reception system as claimed in claim 1 in which each of said delay circuits consists of three separate multiple delay circuits, the output terminal of a first multiple delay circuit being connected to a first input terminal of a first "and" circuit, the response wave being fed to a second input terminal of the first "and" circuit through a first switching circuit and a first "or" circuit, the output terminal of the first "and" circuit being connected to the input terminal of the second multiple delay circuit, the output terminal of the second multiple delay circuit being connected to the first input terminal of the second "and" circuit, a rectangular wave output of the synchronization control circuit being supplied to the second input terminal of the second "and" circuit through a second switching circuit and a second "or" circuit and the output terminal of the second "and" circuit being connected to the third multiple delay circuit.

6. A secondary radar reception system as claimed in claim 5 in which the first and second switching circuits are ganged together.

* * * * *